May 8, 1934.　　　F. J. SHOOK　　　1,957,981
TIRE BUILDING APPARATUS
Filed Feb. 29, 1932　　5 Sheets-Sheet 1
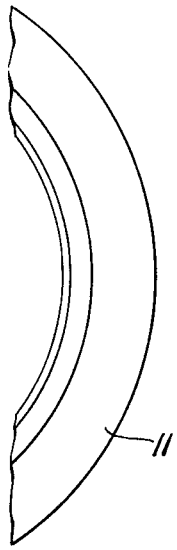
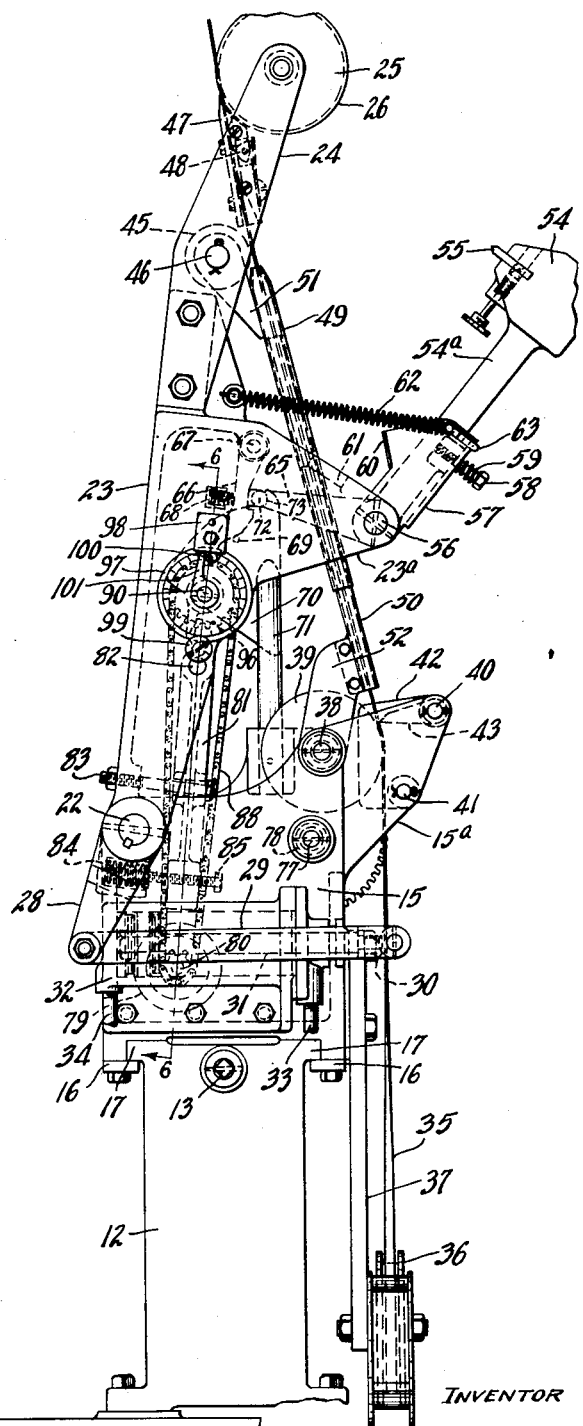
Fig.-1
INVENTOR
FLORAIN J. SHOOK
By Ely & Barrow
ATTORNEYS.

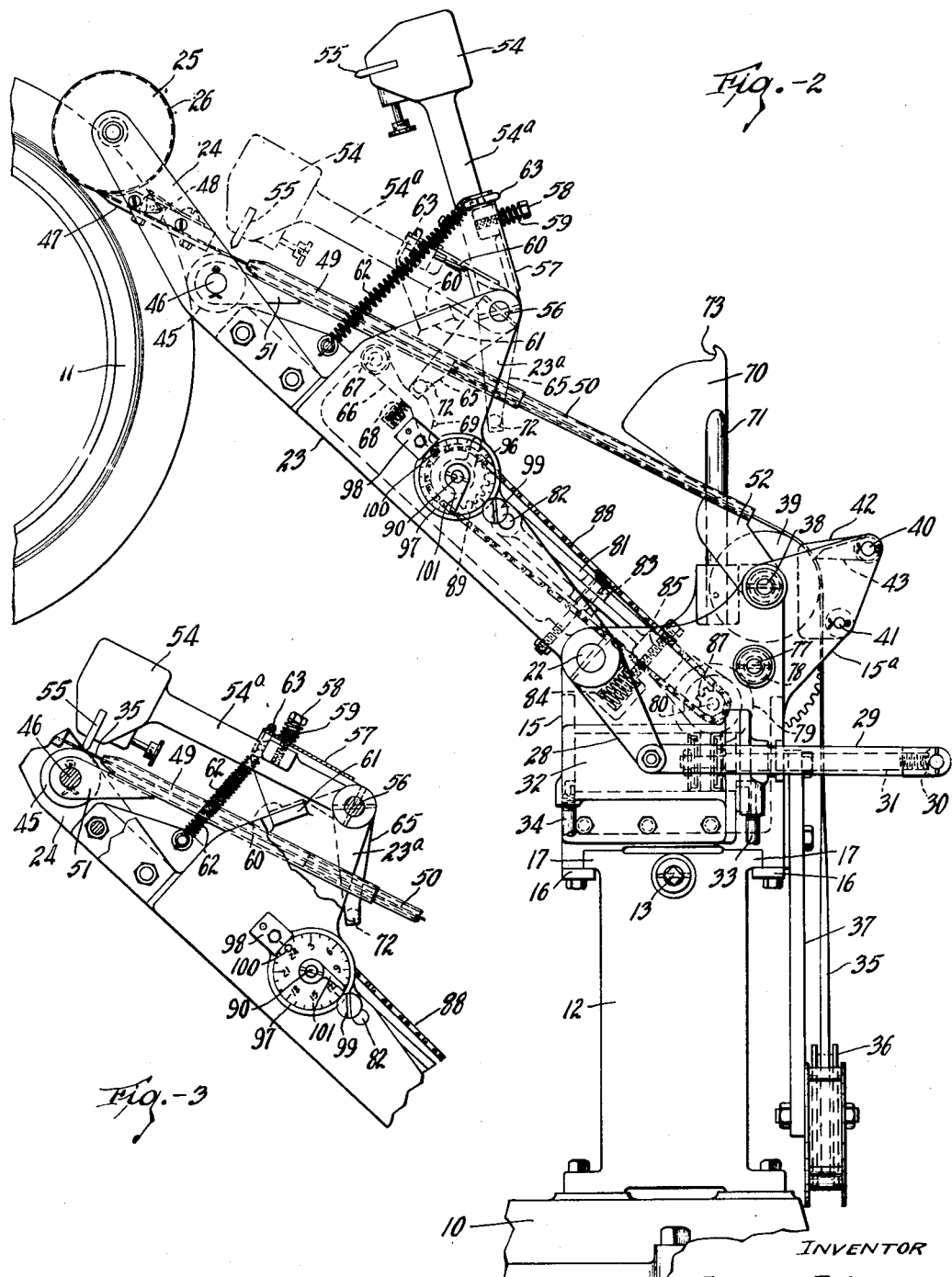

May 8, 1934.   F. J. SHOOK   1,957,981
TIRE BUILDING APPARATUS
Filed Feb. 29, 1932   5 Sheets-Sheet 3
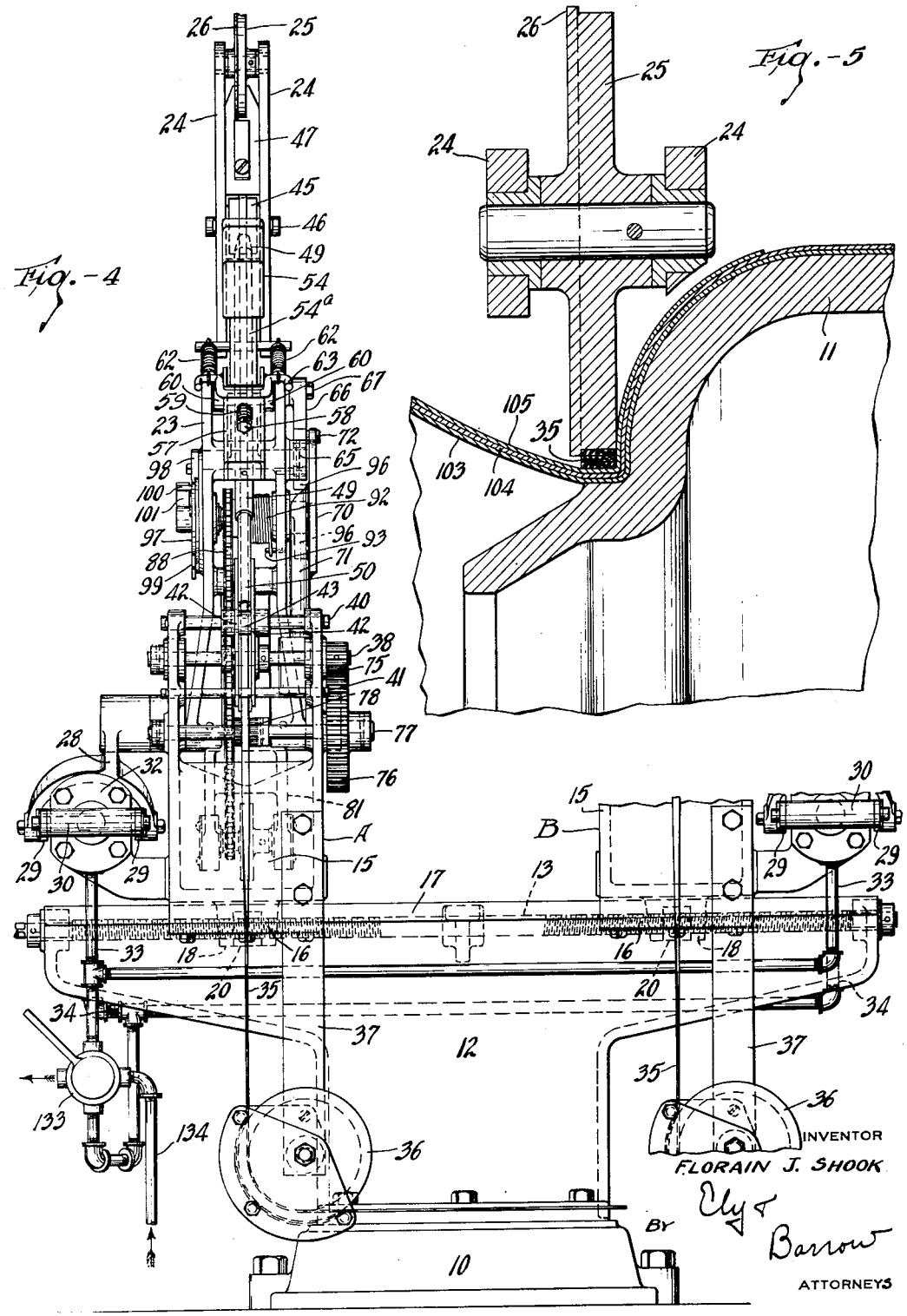

May 8, 1934.  F. J. SHOOK  1,957,981
TIRE BUILDING APPARATUS
Filed Feb. 29, 1932  5 Sheets-Sheet 4

INVENTOR
FLORAIN J. SHOOK
By Ely &
Barrow
ATTORNEYS

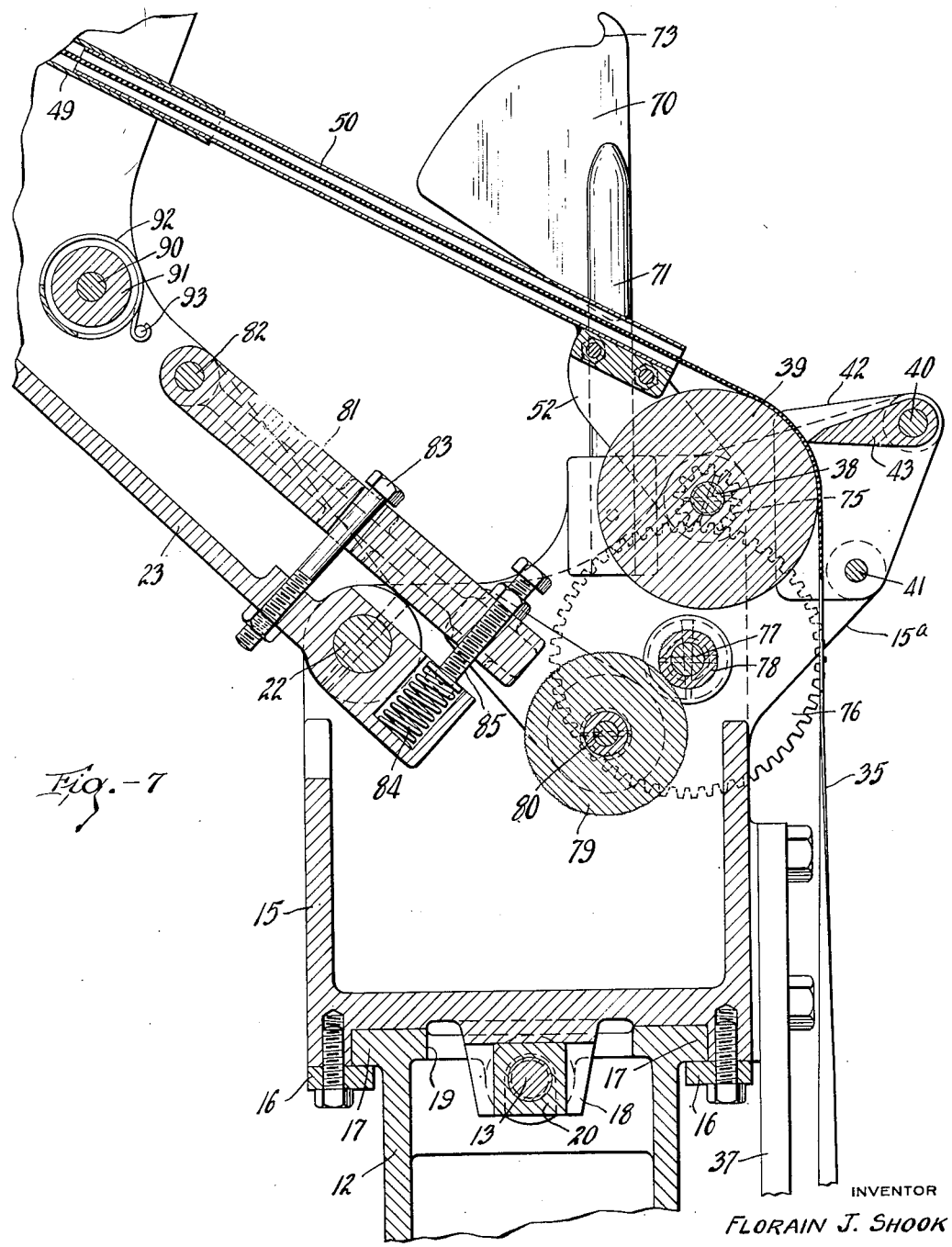

Patented May 8, 1934

1,957,981

UNITED STATES PATENT OFFICE 1,957,981

TIRE BUILDING APPARATUS

Florain J. Shook, Akron, Ohio, assignor to National Standard Company, Niles, Mich., a corporation of Michigan Application February 29, 1932, Serial No. 595,883

21 Claims. (Cl. 154—9)

This invention relates to tire building methods and apparatus, and more especially it relates to procedure and mechanism for building tire bead cores or reinforcements, in situ, concurrently upon the respective marginal portions of a pneumatic tire casing as the latter is being built upon the usual rotatable drum or form.

The bead cores that are built into the tire consist of superposed convolutions of rubberized, wire-reinforced tape of the woven, braided or weftless type, and are essentially similar to the usual type of bead cores which heretofore have been applied to tire casings in the course of construction after having been built to annular form, and provided with flippers, in respective mach'nes built solely for that purpose.

Although the invention is directed primarily to the building of tire bead cores directly onto a tire building form during the construction of tires thereupon, certain parts of the apparatus have a broader application and may be used advantageously for the building of tire bead cores upon suitable forms, which cores may be provided with flipper covers and subsequently mounted in tires, as has been the common practice of previous tire building methods.

The chief objects of the invention are to provide an improved method of building pneumatic tire casings; to provide apparatus for building tire bead cores directly upon a tire casing during the fabrication thereof; to conserve time and labor in the manufacture of pneumatic tires; to improve the product by assuring accuracy of bead size; and to reduce inventories of partly finished goods by eliminating the production of tire beads apart from the tires in which said beads are used. Further objects of the invention are to provide for the use of tire bead material in continuous lengths; to provide improved means for accurately measuring the amount of bead material to be put into each tire bead; to provide improved means for severing the bead material, automatically, after a determinate amount of the latter has been drawn onto the form or drum; and to provide automatic means for feeding the leading end of the bead material forwardly to a determinate position after the said material has been severed at a point rearwardly of said position. Other objects will be manifest.

Of the accompanying drawings,

Figure 1 is a side elevation of apparatus embodying and adapted to carry out the invention, in its preferred form, in inoperative position;

Figure 2 is a similar view thereof, in operative position;

Figure 3 is a fragmentary detail of a part of the apparatus shown in Figure 2 showing the severing mechanism in the act of severing a strip of bead material, parts being broken away and in section;

Figure 4 is a rear elevation of the apparatus, a part thereof being broken away;

Figure 5 is a sectional detail of a portion of the apparatus and the work, showing how the bead material is applied to a partly built tire casing;

Figure 7 is a central vertical section, on a larger scale, through a portion of the apparatus while the latter is disposed in the operative position shown in Figure 2, showing part of the measuring or timing mechanism that controls the operation of the severing mechanism.

Figure 6:
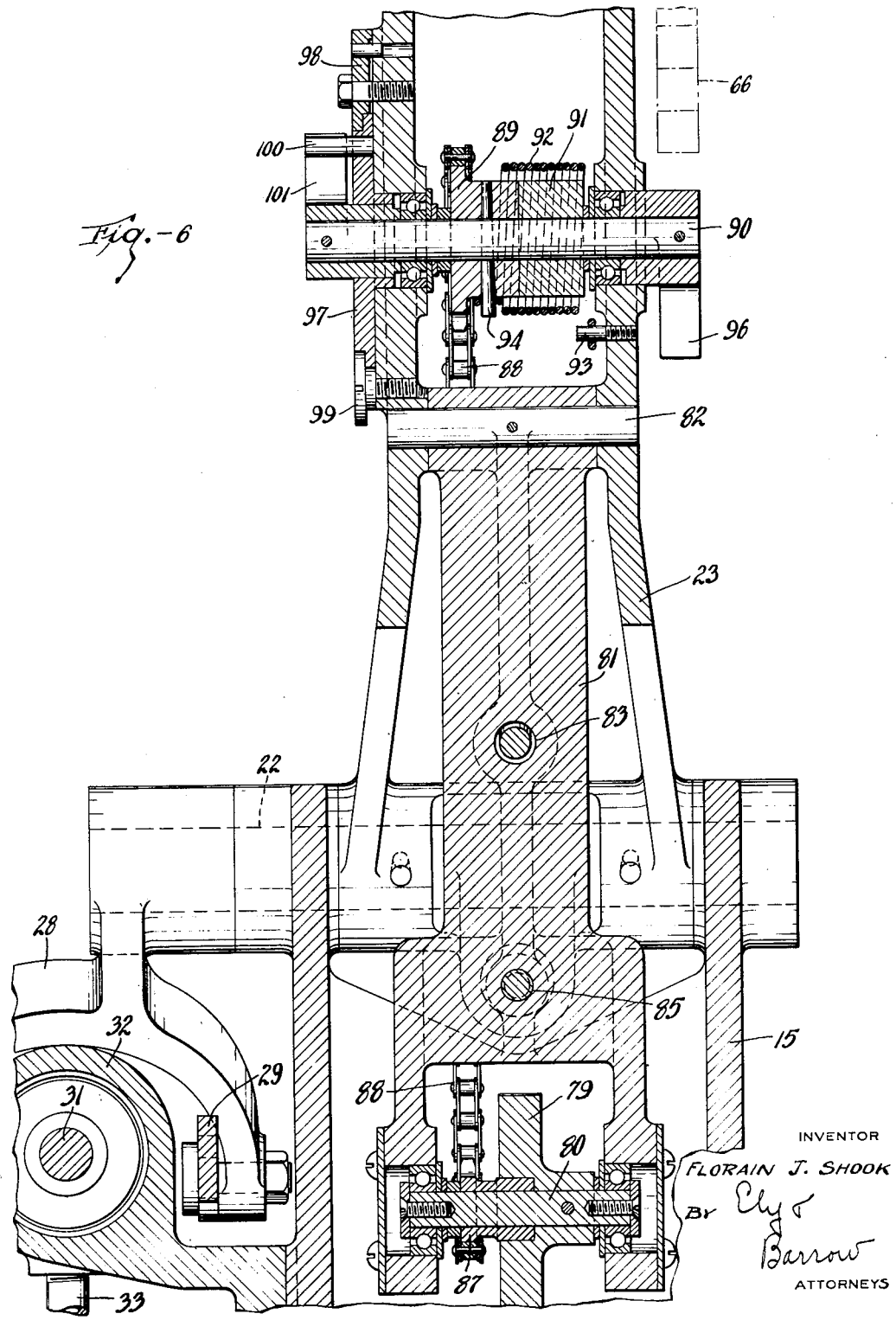
Figure 6 is a section, on a larger scale, on the line 6—6 of Figure 1.

Referring to the drawings, particularly Figure 4 thereof, the apparatus comprises a base plate or casting 10, which may be and preferably is the same base on which the other parts of a tire building machine are mounted, and mounted upon said base plate, laterally of the form or drum 11 of said tire building machine, is an elongate support or standard 12 that slidably supports upon its upper surface a pair of mechanisms generally designated A and B respectively that apply bead forming material to opposite marginal portions of a partly built tire upon the drum 11. The mechanisms A and B are movable toward and away from each other, longitudinally of the support 12 and parallel to the axis of the drum 11, so as to operate upon drums of various widths which may be used. The mechanisms A and B are positioned equidistant each side of the center of the support 12, and said center is aligned with the medial plane of the drum. Said mechanisms are moved toward and from each other by a shaft 13 that is journaled in the support 12 and formed with right and left hand threads that engage the respective mechanisms A and B in a manner presently to be described. Mechanisms A and B are identical in structure so that a description of mechanism A alone will be sufficient.

As is shown in Figure 7, mechanism A comprises a housing or carriage 15 that is slidably secured to the upper surface of the support 12 by means of retaining plates 16, 16 that embrace longitudinally extending lateral flanges 17, 17 formed on said support. The carriage 15 has its bottom formed with a slotted, downwardly extending fork 18 that extends through a longitudinal slot 19 in the top of the support 12 and straddles the shaft 13 on each side of a nut 20 threaded onto the latter. The arrangement is such that rotation of the shaft in either direction moves the carriage longitudinally of the support 12.

Journaled in the opposite lateral walls of the carriage 15, and projecting from one side thereof is a shaft 22 that is disposed parallel to the axis of the drum 11. Secured upon the shaft 22 between the carriage walls is an elongate bracket arm 23, the free end of which has an extension comprising side plates 24, 24, and journaled in the end portion of said side plates is a guide and presser roller 25, the latter being formed with a radially extending flange 26 on one margin of its periphery. It is the roller 25 that applies the bead material to the partly built tire on the drum 11, as is most clearly shown in Figure 5.

The bracket arm 23 has two normal positions, namely, the inoperative position shown in Figure 1 wherein it is slightly over center with relation to the vertical, and the operative, oblique position shown in Figure 2 wherein the guide and presser roller 25 is positioned adjacent the drum. For moving the bracket arm to and from the positions described, the projecting end portion of the shaft 22 is provided with a lever 28 having its free end forked and connected to the respective ends of a pair of parallel links 29, 29, the other ends of said links being connected to a crosshead 30 mounted upon the outer end of the piston rod 31 of a fluid pressure actuated cylinder 32. The cylinder 32 is mounted upon one side of the carriage 15 and is straddled by the forked end of the lever 28. The cylinder 32 is of the double acting type and is provided with the usual fluid inlet and outlet pipes 33, 34 at its respective ends. It is desirable that the bead building units A and B operate in unison, and to this end a common four-way valve 133 is provided for concurrently operating the fluid pressure cylinder of the respective units, said valve being connected to a source of pressure fluid (not shown) through pipe 134.

The bead building material, designated 35, comes to the apparatus in a continuous length and consists of a flat, tape-like structure comprising braided or woven wire strands covered with unvulcanized rubber composition. The material 35 may be stored on a suitable reel remote from the apparatus, and is guided into the apparatus by a flanged guide-sheave 36 that is journaled upon a downwardly-extending bar 37 that is secured to the carriage 15 at the rear thereof, the tape making a 90° turn about said sheave. Journaled in the upper portion of the carriage 15, at the rear thereof, is a shaft 38 upon which is mounted a pulley 39 over which the tape 35 is trained, the tape, because of its normal tackiness, having good frictional driving contact with said pulley so as to drive the latter when the tape is drawn forwardly by the rotation of the drum 11. Integral brackets 15a, 15a extending rearwardly from the respective side walls of the carriage 15 carry spaced cross-bars 40, 41, and carried by the latter are a pair of side-plates 42, 42 that abut the lateral faces of the pulley 39 at the rear thereof and thus prevent the tape 35 from slipping off said pulley. The cross-bar 40 carries a stop-pawl 43 that engages the tape 35 on the pulley to prevent recession of the tape.

Between the pulley 39 and the guide and presser roller 25, relatively near the latter, is a tape-severing station comprising a hammer and an anvil, the latter consisting of a hardened steel roller 45 over which the tape 35 is drawn in passing from pulley 39 to roller 25. The anvil roller 45 is journaled on a shaft 46 between the side plates 24, the shaft 46 being supported by said side plates.

Between the anvil roller 45 and the roller 25 is a tubular tape-guide 47 that is supported by the side plates 24, and which carries a spring-pressed pawl 48 that engages the tape 35 to assist pawl 43 in preventing recession of the tape. Between the anvil roller 45 and the pulley 39 is a telescopic tubular tape-guide comprising a large member 49 and a smaller member 50 slidably telescoped therewith. The member 49 is swiveled on the shaft 46 by means of a clevis 51 and member 50 is swiveled on shaft 38 by means of a clevis 52.

The arrangement of shafts 22, 38 and 46 is such that when shaft 46 moves orbitally about shaft 22 as an axis, due to movement of arm 23 in moving to and from operative and inoperative positions, the distance between shafts 38 and 46 either is increased or diminished, and the feature of the telescopic tape guide assures adequate support for the tape at all times and prevents it from buckling. In moving from the operative position shown in Figure 2, which occurs after the tape 35 has been severed on the anvil roller 45, the distance between the latter and pulley 39 is diminished, but the pawl 43 prevents recession of the tape backward from said pulley, with the result that the natural stiffness of the tape causes its leading end to be projected past the anvil roller and through the guide 47 to a position beneath the roller 25, as is most clearly shown in Figure 1. In this position the tape is engaged by pawl 48 so that there is no recession of the tape and it is drawn forwardly over pulley 39 when the arm 23 subsequently is moved downwardly to the operative position shown in Figure 2.

The severing of the tape 35 upon the anvil roller 45 is effected by a hammer 54 that carries a chisel-like cutting member 55. Experience has shown that excellent results are obtainable when the hammer operates with a whip-like action, that is, when it snaps away from the anvil roller immediately the tape is severed. To this end the hammer 54 is formed with an arm or handle portion 54a that is secured to a shaft 56 that is journaled in brackets 23a, 23a projecting from the arm 23. Pivotally mounted upon the shaft 56 and straddling arm 54a of the hammer is a saddle 57 to which the said hammer arm is yieldingly connected by means of cap-screw 58, a compression spring 59 being interposed between the saddle and the head of the cap-screw. The saddle 57 is formed with laterally extending feet 60, 60 that engage respective lugs 61, 61 formed on the bracket 23a, when the hammer is moved downwardly to cut the tape 35. The downward movement of the hammer is effected by means of a pair of tension springs 62, 62 disposed on opposite sides of the hammer and connected at one of their ends to a yoke 63 that is secured to the saddle 57, and at their other ends are connected to the arm 23.

The arrangement is such that feet 60 of the saddle 57 engage the lugs 61 when the hammer is in the broken line position shown in Figure 2, the remaining downward movement of the hammer being caused by its momentum and inertia acting against spring 59, whereby the hammer moves to the position shown in Figure 3 to sever the tape 35, and immediately is retracted by said spring to the broken line position of Figure 2. Not only is the tape severed effectively, but the hammer is lifted from the anvil roller so that the leading end of the tape subsequently may be fed forward as hereinbefore described.

The hammer 54 normally is maintained in raised, inoperative position shown in full lines in Figures 1 and 2, against the tension of springs 62, by latching means comprising a latching lever 65 mounted upon an extension of shaft 56 on the far side of the arm 23, as viewed in Figures 1, 2 and 3, and a latch 66 that is pivoted at 67 on the arm 23 and backed by a compression spring 68 that normally urges its free end against a positive stop 69. For moving the hammer from the lowered position of Figure 3 to the raised position of Figures 1 and 2, a suitable cam plate 70 is mounted upon a post 71 rising from the carriage 15, said cam plate being so positioned as to engage a cam roller 72 projecting laterally from the latching lever 65, when the arm 23 is raised from the operative position of Figure 2 to the inoperative position of Figure 1, whereby the latching lever is rocked to move the hammer to the position shown in Figure 1, and the free end of the latching lever is moved into latching engagement with the latch 66. A hook formation 73 on the cam plate 70 provides a positive stop for the arm 23 when engaged by the cam roller 72.

The tape-severing operation is effected by the unlatching of the lever 65 whereby the tension springs 62 move the hammer 54 toward the anvil roller 45. The unlatching of the lever 65 is effected by mechanism that is set in motion by the tape 35 as it is fed forward to the drum, the unlatching occurring when a determinate length of tape has passed over the pulley 39. The unlatching mechanism includes adjusting means whereby the severing mechanism may be actuated to cut the tape after various lengths of tape have passed the pulley 39. Thus the unlatching mechanism also serves to measure the length of the severed piece of tape. The unlatching or measuring mechanism is operative only when the device is in the operative position shown in Figure 2, and during operation it stores up energy in a torsion spring, which spring serves to restore some of the movable parts thereof to point of starting when the device is moved from the operative position of Figure 2 to the inoperative position of Figure 1.

The construction of the unlatching and measuring mechanism is best shown in Figures 6 and 7. The shaft 38 of pulley 39 has secured thereon, exteriorly of the carriage housing 15, a gear pinion 75 that is meshed with a relatively large gear 76 mounted upon a shaft 77 that is journaled in the carriage walls, and interiorly of the carriage housing the shaft 77 carries a friction roller 78 that is peripherally engaged, upon occasion when the arm 23 is in its lowered operative position, by a friction roller 79. The latter is mounted upon a shaft 80 that is journaled in the forked end portion of a friction lever 81 that is yieldingly mounted upon the pivoted end portion of the arm 23. The mounting of the friction lever 81 consists of a pivot pin 82 at one end by means of which it is pivoted to the arm 23, a limiting bolt 83 that passes freely through the friction lever and is threaded into arm 23 for limiting pivotal movement of the friction lever, and a compression spring 84 that is mounted in the arm 23 and bears against an adjustable stud 85 that is mounted in the free end of the friction arm. The arrangement is such as normally yieldingly to urge the friction roller 79 against the friction roller 78 when the arm 23 is in operative position. Preferably the friction rollers 78, 79 are knurled or otherwise roughened to provide adequate driving friction between them.

Mounted upon the shaft 80 with the friction roller 79 is a sprocket 87 that is connected by a sprocket chain 88 with a sprocket 89 that is mounted upon a shaft 90 that is journaled near the middle of the arm 23 adjacent the free end of the latch 66. On the shaft 90, beside the sprocket 89, is mounted a drum 91 about which is wrapped a torsion spring 92, one end of said spring being connected to a stud 93 projecting from the arm 23, and the other end of the spring being connected to the pin 94 that secures the sprocket 89 to shaft 90. The arrangement is such that the force of the spring 92 is applied to the shaft 90, and the latter is rotated to store up energy in the said spring when the tape 35 is fed forwardly over the pulley 39, the latter having connection with said shaft through the gears, friction rollers, and sprocket chain just described. Mounted upon the end of the shaft 90 adjacent the latch 66 is a trip lever 96 that is turned angularly by rotation of the said shaft so that its free end is brought into engagement with the free end of latch 66 to depress the latter against spring 68 to release latching lever 65 that controls the operation of the hammer 54.

The timing or measuring feature of the apparatus, by which the length of the severed piece of tape 35 is determined, is the result of means provided for adjusting the normal inoperative position of the shaft 90 and trip lever 96 whereby they are required to move angularly through a greater or less distance before the latch 66 is tripped.

To this end a calibrated dial 97 is mounted upon the arm 23 concentric with the shaft 90, said dial being angularly rotatable, but normally being secured against rotation by a clamp 98 that engages the marginal portion of the dial. A hold-down screw 99 also engages the dial remote from the clamp 98. Projecting forwardly from the front face of the dial 97 is a stop-pin 100 that provides a stop for a stop-lever 101 mounted upon the end portion of the shaft 90. It will be seen that angular adjustment of the dial 97 varies the normal angular inoperative position of the shaft 90 whereby greater or less movement or time is required for the trip-lever 96 to engage the latch 66 during the operation of the apparatus.

In the operation of building a pneumatic tire casing, the bead building mechanisms A and B are in the retracted inoperative position shown in Figures 1 and 4 while the under-bead tire-carcass plies, such as the fabric plies 103, 104, Figure 5, and flipper strip 105 are applied to the drum 11 and rolled down into place thereon, especially in the bead-seats adjacent the lateral margins of the drum. Fluid pressure is then admitted concurrently to the front ends of cylinders 30 of the bead mechanisms A and B whereby their arms 23 are moved downwardly to the position shown in Figure 2 with the result that the leading ends of the tapes 35 are adhesively attached to the tire building material on the drum by the pressure of the rollers 25. The foregoing operation may take place while the drum 11 is rotating, and the rotation of the drum draws the tapes through the apparatus and wraps it about said drum in a plurality of superposed convolutions, as is most clearly shown in Figure 5.

The drawing of the tape 35 through the respective mechanisms A and B drives the pulleys 39 of each of them and thereby drives the gears 75, 76, friction rollers 78, 79, sprockets 87, 89, and shafts 90 against the force of the torsion springs 92 whereby the trip levers 96 are turned angularly until they engage and unlatch the latches 66, thus releasing the latching levers 65 and permitting the tension springs 62 to swing the hammers 54 downwardly so that their chisel-like members 55 sever the tape 35 against the anvil rollers 45. The drum 11 continues to rotate so that the trailing ends of the tapes 35 are pressed onto the drum by the rollers 25. Severing of the tapes 35 disconnects them from the drum so that their forward feeding through the apparatus ceases, the pawls 43 then preventing recession of the tapes.

The rear ends of the cylinders 30 are then charged while their front ends are discharged, thus lifting the arms 23 to the upright inoperative position shown in Figure 1. The immediate result of the elevating of the arms 23 is to swing the friction roller 79 of each mechanism A or B out of driving engagement with the friction roller 78, and thus to permit the torsion spring 92, in which energy has been stored by the previous feeding of the tape, to rotate the shaft 90 and connected mechanism reversely until brought to a determinate stop when the stop-lever 101 strikes the stop-pin 100.

During the rising movement of each arm 23, the end portion thereof moves closer to the pulley 39, whereby the leading end of the tape 35 is projected past the anvil roller 45 on which it was severed, and passes through the guide 47 and under the roller 25, being engaged by the pawl 48 in the guide 47. The arrangement is such that when the arm 23 subsequently is lowered to operative position, the pawl 48 holds the leading end of the tape in its projected position so as to engage the drum 11.

Near the finish of the rising movement of the arm 23, the cam-roller 72 of the latching lever 65 engages the cam 70, and the latter is so constructed and arranged as to move the lever 65 angularly and thereby to swing the hammer 54, against the tension of the springs 62, from the broken line position shown in Figure 2 to the full line position shown in Figure 1. In the latter position the free end of the latching lever 65 is engaged and retained by the latch 66. This completes a cycle of operation, which may be repeated as often as desired.

The apparatus is automatic in operation, and does not require the stopping of the rotation of the drum either at the start or finish of the bead-applying operation, so that the subsequent steps of turning up the fabric piles over the finished bead core may be immediately proceeded with. The apparatus is economical in operation and achieves the various objects set out in the foregoing statement of objects.

Modifications may be resorted to without departing from the spirit of the invention or the scope of the appended claims, which are not limited wholly to the specific construction shown or the exact procedure described.

What is claimed is:

1. The combination with tire building apparatus including an annular tire building form, of a pair of bead setting instrumentalities disposed laterally of the form, means for adjusting said instrumentalities to align them with the respective bead-receiving portions of the said form, and means for moving said instrumentalities concurrently into and out of operative association with said form.

2. The combination with tire building apparatus including an annular tire building form, of a pair of pivotally mounted bead setting instrumentalities disposed at one side of said form, means for adjusting said instrumentalities from and toward each other to align them with the respective bead-seats on said form, and means for effecting concurrent pivotal movement of said instrumentalities to move them into and out of operative association with said form.

3. Apparatus for building tires, said apparatus comprising strip guiding mechanism, means for moving said mechanism into and out of operative association with a tire building form, to guide a continuous strip of bead-building material to said form, and means controlled by the movement of the strip for severing the latter after a determinate amount thereof has passed a certain point in the mechanism.

4. Apparatus for building tires, said apparatus comprising strip guiding mechanism, means for moving said mechanism into and out of operative association with a tire building form, to guide a continuous strip of bead-forming material to said form, means controlled by movement of the strip for severing determinate lengths of the latter, and adjusting means for the severing means whereby the latter is adapted to sever various lengths of the strip material.

5. Apparatus for building tires, said apparatus comprising strip guiding mechanism, means for moving said mechanism into and out of operative association with a tire building form, said mechanism including a roller adapted to press the leading end of a continuous strip of bead-building material adhesively onto said tire building form, means for severing the strip of material at a point removed from said strip-pressing roller, and means for advancing the leading end of the continuous strip into operative association with said roller.

6. A combination as defined in claim 5 in which the means for advancing the leading end of the continuous strip into association with the strip-pressing roller operates automatically when the mechanism is moving from operative to inoperative position with relation to the tire building form.

7. Apparatus for building tires, said apparatus comprising strip guiding mechanism having normal operative and inoperative positions with relation to a tire building form, strip severing means adapted to sever a continuous strip of material passing through said mechanism onto the tire building form, said severing means having operative and inoperative positions with relation to the strip guiding mechanism, and means for moving the severing means to inoperative position on the guiding mechanism as the latter is moved to inoperative position with relation to the tire building form.

8. A combination as defined in claim 7 in which the means for moving the severing means to inoperative position is a cam.

9. In apparatus of the character described the combination of strip guiding mechanism having normal operative and inoperative positions with relation to a rotatable annular form, an anvil roller on said mechanism over which said strip material passes, a hammer associated with said anvil roller for severing the strip passing thereover, and means for causing said hammer to operate to sever said material after a determinate quantity thereof has passed through the strip-guiding mechanism.

10. In apparatus of the character described, the combination of strip guiding mechanism having normal operative and inoperative positions with relation to a rotatable annular form, and adapted to guide a continuous strip of material onto said form, an anvil roller over which said strip material passes, a hammer associated with said anvil roller for severing the strip passing thereover, spring means for operating said hammer, latch means for retaining said hammer in inoperative position against the tension of said spring, and means for releasing said latching means when a determinate length of strip material has passed through the mechanism.

11. A combination as defined in claim 10 in which the unlatching means is operated by the strip material in its passage through the mechanism.

12. A combination as defined in claim 10 including means for latching the hammer operated automatically by the movement of the mechanism from operative to inoperative position.

13. The combination of strip guiding mechanism positionable adjacent an annular form for delivering strip material thereto, an anvil on said mechanism over which the strip material passes, a hammer having a cutting edge adapted to sever the material upon said anvil, yielding means for swinging said hammer against the anvil, and yielding means for retracting the hammer from the anvil immediately after it strikes the latter.

14. The combination of strip guiding mechanism positionable adjacent an annular rotatable form for delivering strip material thereto, an anvil on said mechanism over which the strip material passes, a hammer having a cutting edge adapted to sever the material upon said anvil, a saddle mounted upon said hammer, yielding means connecting the saddle and hammer, and yielding means connected to the saddle for urging the hammer toward the anvil, said saddle being formed with abutments for stopping its movement under impetus of the last mentioned spring whereby the momentum and inertia of the hammer causes it to continue its cutting movement against the force of the spring that connects it to said saddle.

15. In apparatus of the character described, the combination of strip guiding mechanism having normal operative and inoperative positions with relation to an annular rotatable form, strip severing means thereon adapted to sever a continuous strip of material passing through said mechanism to said form, and means for actuating said severing means comprising means that is in driving engagement with the strip material in the operative position of the mechanism and out of driving engagement therewith in the inoperative position of the mechanism.

16. In apparatus of the character described the combination of strip guiding mechanism having normal operative and inoperative positions with relation to an annular rotatable form, strip severing means adapted to sever a continuous strip of material passing through said mechanism to said form, a latch for holding the strip severing means in inoperative position, means controlled by the feed of the strip for releasing said latch to effect severing of the strip material, said latch-releasing means having a normal position from which it is moved by the feed of the strip material, and means for restoring the latch-releasing means to normal position when the mechanism as a whole is moved to inoperative position away from the form.

17. A combination as defined in claim 16 including means for adjusting the normal position of the latch releasing mechanism to alter the timing of the strip severing means.

18. In apparatus of the character described the combination of a pivotally mounted arm the free end of which is movable toward and away from an annular rotatable form, a telescopic work-guide pivotally connected at one end to the free end of said arm and pivoted at its other end at a point removed from the pivot of said arm, whereby the work-guide is shortened when the free end of the arm is moved away from said form, and stop-pawls at the respective ends of said work-guide for preventing recession of continuous strip material passing through said work-guide.

19. A combination as defined in claim 18 including strip severing means between the work-guide and the pawl at the free end of said arm.

20. The combination of strip guiding mechanism, a hammer having a cutting edge, means cooperating with said cutting edge for severing strip material passing therebetween, means for causing said hammer to operate to sever said material after a determinate quantity thereof has passed through the strip-guiding mechanism, and yielding means for retracting the hammer immediately after the material is severed.

21. The combination of a rotatable form, means for feeding a continuous strip of material onto said form, and means for severing said material when a determinate amount thereof is on the form, said means comprising a hammer having a cutting edge, spring means for swinging said hammer toward the work, latch means for retaining said hammer in inoperative position against the tension of said spring, means for releasing said latching means, means for retracting the cutting edge of the hammer from the path of the material immediately after the latter is severed, and means cooperating with the cutting edge of the hammer for severing said material.

FLORAIN J. SHOOK.